United States Patent [19]
Bass et al.

[11] Patent Number: 6,041,319
[45] Date of Patent: Mar. 21, 2000

[54] METHOD AND SYSTEM FOR TELEPHONE UPDATES OF POSTAL SCALES

[75] Inventors: Edward R. Bass, Trumbull; Konstantin G. Kodonas, Norwalk; Vincent R. Weis, Sandy Hook, all of Conn.

[73] Assignee: Pitney Bowes Inc., Stamford, Conn.

[21] Appl. No.: 08/892,116

[22] Filed: Jul. 14, 1997

[51] Int. Cl.$^7$ .................................................. G07B 17/00
[52] U.S. Cl. ........................ 705/409; 395/712; 705/401; 705/410; 713/100
[58] Field of Search .................................... 395/651, 652, 395/653, 712; 705/400, 401, 409, 410; 713/1, 2, 100

[56] References Cited

U.S. PATENT DOCUMENTS

| | | | |
|---|---|---|---|
| 4,084,242 | 4/1978 | Conti ........................................ | 705/407 |
| 4,122,532 | 10/1978 | Dlugos et al. ............................ | 705/409 |
| 4,138,735 | 2/1979 | Allocca et al. .......................... | 705/409 |
| 4,868,758 | 9/1989 | Kokubu .................................... | 705/400 |
| 4,872,119 | 10/1989 | Kajimoto ................................ | 705/402 |
| 5,077,660 | 12/1991 | Haines et al. ............................ | 705/410 |
| 5,107,455 | 4/1992 | Haines et al. ............................ | 395/828 |
| 5,369,401 | 11/1994 | Haines ..................................... | 705/402 |
| 5,448,641 | 9/1995 | Pintsov et al. ............................ | 380/51 |
| 5,612,884 | 3/1997 | Haines ..................................... | 705/403 |
| 5,615,120 | 3/1997 | Schwartz et al. ....................... | 705/407 |
| 5,751,799 | 5/1998 | Mori ........................................ | 379/114 |

Primary Examiner—Edward R. Cosimano
Attorney, Agent, or Firm—Charles R. Malandra, Jr.; Melvin J. Scolnick

[57] ABSTRACT

A postal scale system is updated, by telephone or other communication medium, by a remote service provider whenever postal rates or regulations are changed, without requiring shipment or replacement of IC chips. The system provides for remote updating of both application software and databases such as rates, zip codes and the like. By having direct communication between the provider and the postal scale, the invention permits relevant data, including scale model number, software version number and the like to be accessed by the provider, thus to update the service provider's database and to provide updates only to the correct systems. The inventive system further uses automated telephone billing, available as 1-900 service, thus to reduce expenses and errors associated with billing for update services.

12 Claims, 3 Drawing Sheets

6,041,319

METHOD AND SYSTEM FOR TELEPHONE UPDATES OF POSTAL SCALES

FIELD OF THE INVENTION

This invention relates to a system for updating data associated with automated postage scales for determining postage, and more particularly to updating of software used in such systems both at the user end, including rate and other data used to determine the postage as well as application software used to provide various operating features and characteristics to the user system, and data used by the service supplier, such as data identifying users and locations of specific models and serial numbers as well as version numbers for the software at the various user sites and other user information. The invention thus relates to a facility for updating such software data for postal scales in remote postage systems by use of telephone transmission lines or other media, is as well as to assessing charges for such updates by using existing telephone billing services, such as a 1-900 service available from various telephone companies.

BACKGROUND OF THE INVENTION

Computer controlled and electronically operated postal scales are known in the art. Such scales may be included within a customer based postage system or may be stand-alone items, used to determine the necessary postage for mail pieces being prepared for delivery. It is also known that postal scales store postal rate data, that such postal rate data is subject to revision, and that the data stored in the scales needs to be updated at various times.

For example, U.S. Pat. No. 4,872,119 to Kajimoto describes such a postal scale which operates in accordance with a program stored in a ROM (Read Only Memory). The disclosed system includes a charge table in ROM which stores rate and service data, for example, for use as a look up table. When it is necessary to provide updated rate data, the same is provided by manually inputting the same to the look up area of the ROM. Such a system thus requires extensive manual effort in order to update the data used to generate postage. As such data are set by a number of service providers, such as the US Postal Service, Federal Express and UPS for example, and as changes are thus frequently implemented, updating the service data, rate data and other information used therein becomes extremely expensive and troublesome.

U.S. Pat. No. 4,084,242 to Conti describes an electronic postage weighing scale 10 which similarly determines the postage value of weighed articles. As shown in FIG. 1, a known postal scale of the type disclosed in the Conti patent includes a front panel 11 having thereon a keyboard 12. The illustrated scale includes a pull-out draw 14, shown in phantom in its withdrawn state. A weighing pan 16 is provided at the top of scale 10, supported by a support member 17 connected to a transducer 19 to form a load cell of the scale. The scale is electronically controlled and operated, by electronics 20 which includes a number of removable circuit chips 22 on an IC (Integrated Circuit) board 23. Information provided by the scale to a user is displayed on a display 21.

The chips may include PROM (Programmable Read Only Memory) chips which store a postal rate table to simplify updating of the rates. When postal rates are changed, a new or updated chip is mailed or supplied to the user. The user is then required to pull out the draw from the housing, remove the old outdated chip from the IC board, install the new chip in substitution therefor, and push the draw back into the housing. While the advance provided in this patent eliminates much of the difficulty associated with updating scales to account for changes in data, operator intervention is nonetheless required and the possibility of operator error remains,. as does the possibility that the new or updated chip may become lost or damaged in transition or in the mails.

U.S. Pat. No. 4,122,532 to Dlugos et al overcomes difficulties associated with such operator intervention in a process for updating postage rate data in memories associated with remote mail processing apparatus. The system disclosed in this patent encodes the revised postage rate data into tone signals at a central data processing facility and transmits the tone signals to the remote mail processing apparatus over a telephone line. The mail processing apparatus includes a decoder, in the form of a modem, receiving the signals transmitted thereto. After decoding the received tone signals to binary data, a data processor in the apparatus responds to the binary data and updates the memory with the revised postage rate data. While implementing a data update from a remote location more efficiently than the prior art, the disclosure does not address the manner of applying possible charges for the service, or the possibility that the very operation and functioning of the scale may become out-moded and subject to revision.

U.S. Pat. No. 5,615,120 to Schwartz et al. also discloses an electronic postage scale system in which postal rates and charges are updated without replacing a memory. However, as disclosed therein, such updates are implemented analogously to the disclosure of the above noted patent to Conti. That is, in the illustrative preferred embodiment the application program and operating system are stored in a flash EEPROM (electrically erasable programmable read only memory) within the console, and the rate schedule data are stored in a rate module within the same. Whenever there is a change in the postage rates, shipping charges, or other cost factors, the data in that particular (rate) module is overwritten with new data. Rather than replacing the EEPROM, the patent discloses providing to the user an IC card, which includes an EPROM (electrically programmable read only memory) or a flash EEPROM which includes the new rate schedule data along with header information specifying the nature of the data. To download the new rate schedule data a user is required to insert the IC card containing the new data into a connector. Upon initialization, a microprocessor within the system accesses the data in the IC card and downloads the same to the EEPROM module within the console, thus updating the data. Thereafter, the user removes the IC card which can then be returned to the card originator for reuse. However, the preferred embodiment continues to require manual intervention by insertion of an IC card in the console, does not describe a manner of assessing and/or collecting charges or fees associated with the service, and does not describe changing other software in the scale, such as the application running therein.

Though not necessarily forming part of the present invention, the above described disclosures are helpful in understanding the environment in which the present invention is believed to be most helpful. To eliminate the necessity for detailed description of such an environment, and of the details of postal meters and postage systems utilizing the same, the contents of each of the above described prior art documents is hereby specifically incorporated by reference.

However, none of these prior art disclosures provides for a system which permits an economical implementation of bi-directional data update, wherein a service provider is provided with an update of information relevant to field distribution and location of its equipment, indicative of location, usage, and users of specific models and versions.

Thus, none of the above described disclosures updates user software, including application software or firmware and data identifying changes in rates, zip codes, mail zones or directory data, and supplies to the service provider update data from the user, such as customer name and address, or equipment identification such as model number, software version numbers, etc.

Still further, the prior art fails to provide a straightforward approach to updating a database of the service provider, enabling rapid collection of data relevant to location of various models and versions of equipment supplied by the provider equipment, without imposing burdens on users to provide the data.

Moreover, while the use of 1-900 telephone billing services is generally known in the art, the prior art fails to provide for a prompt and efficient assessment, billing and collection of service fees from users availing themselves of software updating services of the type described herein, particularly for updating of postal rate data and associated software for postal scales.

There is accordingly a need in the prior art for an apparatus and method for updating postal scales of the type used in postage meter systems, whether by providing updates in rates and other data or by providing updates for software and applications running on the user system.

There is more specifically a need for a system which permits an economical implementation of bi-directional data update for postal scales, wherein a service provider is provided with an update of information relevant to field distribution and location of its equipment, and a user is provided with updated software and data.

There is also a need in the prior art for apparatus and method to enable a provider of postal scale equipment and service to bill for and collect fees for updating data and/or software applications provided to users in a simple and economic fashion.

Additionally, there is a need in the prior art for a method of providing data to a supplier of postage equipment, to enable the supplier to maintain a database identifying the location of specific models of equipment and versions of software and data being used therein.

There is a more specific need in the prior art for a method of providing data to a supplier of postage equipment, to enable the supplier to maintain a database identifying the location of specific models of equipment and versions of software and data being used therein which does not rely on accuracy of inputs by a user, and which is implemented automatically while servicing the user.

SUMMARY OF THE INVENTION

It is accordingly an object of the present invention to provide a system for economically implementing bi-directional data update for postal scales, wherein a postal scale service provider is provided with update of information relevant to field distribution and location of its equipment, indicative of location, usage, and users of specific models and versions and a user is provided with updates of software and data.

It is another object of the invention to enable a provider of postal scale equipment and service to collect fees for updating data and/or software applications provided to users in a simple and economic fashion.

It is a more specific object of the invention to provide a method enabling a supplier of postage equipment to update user software and data, and to collect fees for updating data and/or software applications provided to users in a simple and economic fashion.

It is still another object of the invention to provide a system for economically implementing a data update for postal scales, wherein a user is provided with updates of software and data and a postal scale service provider is provided with update of database information, such as field distribution and location of its equipment, users of specific models and versions of software and data being used therein, while also enabling the provider to collect fees for the user update.

These and other objects, features and advantages of the present invention will become readily apparent to those skilled in the art from the following description and drawings, wherein there is shown and described a preferred embodiment of the invention, simply by way of illustration and not of limitation of one of the best modes (and alternative embodiments) suited to carry out the invention. The invention itself is set forth in the claims appended hereto. As will be realized upon examination of the specification and drawings and from practice of the same, the present invention is capable of still other, different, embodiments and its several details are capable of modifications in various obvious aspects, all without departing from the scope of the invention as recited in the claims.

Accordingly, the drawings and the descriptions provided herein are to be regarded as illustrative in nature and not as restrictive of the invention.

BRIEF DESCRIPTION OF THE DRAWINGS

The accompanying drawings, incorporated into and forming a part of the specification, illustrate several aspects of a preferred embodiment of the present invention and, together with the description, serve to explain the principles of the invention. In the drawings.

DETAILED DESCRIPTION OF THE PREFERRED EMBODIMENTS

Figure 1:
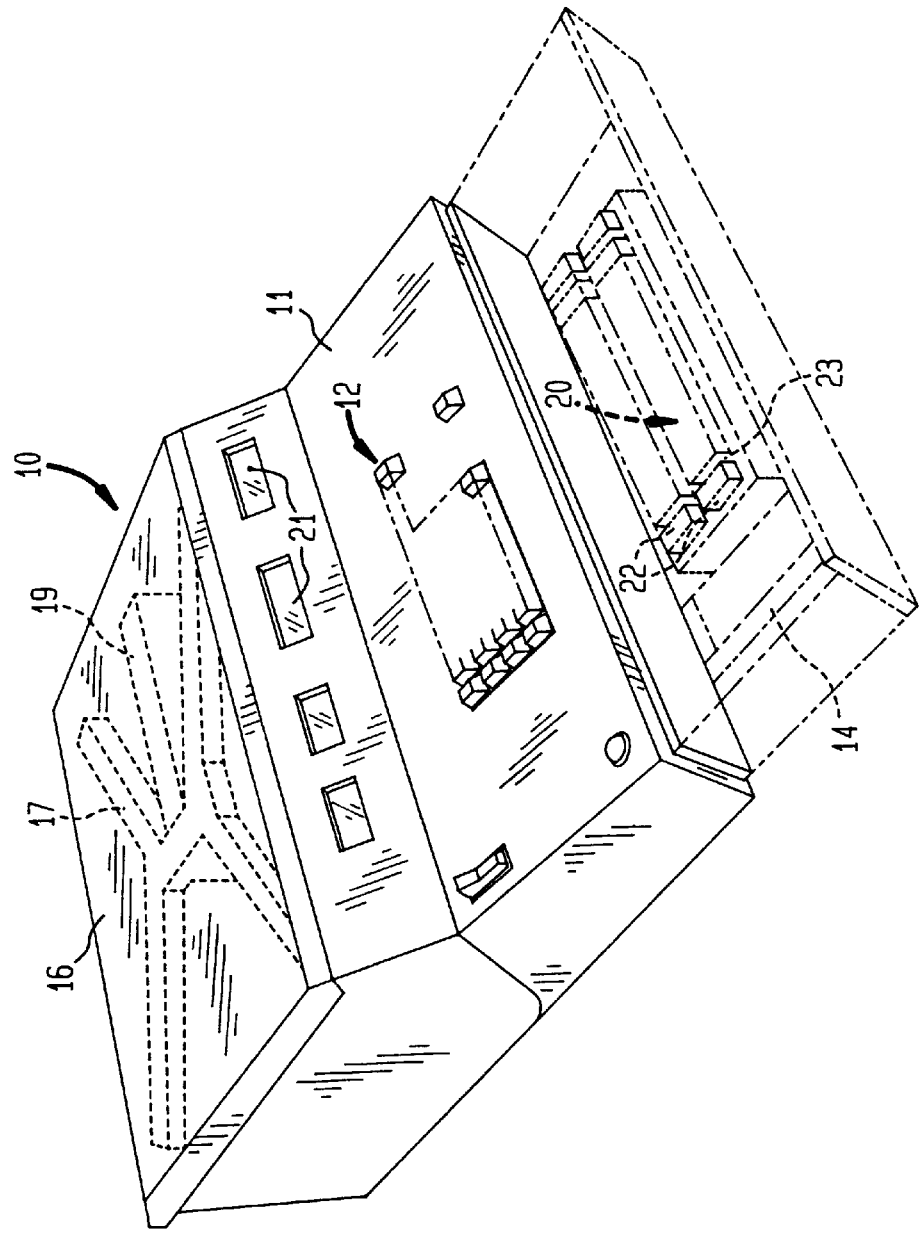
FIG. 1 shows a known postal scale.
Figure 2:
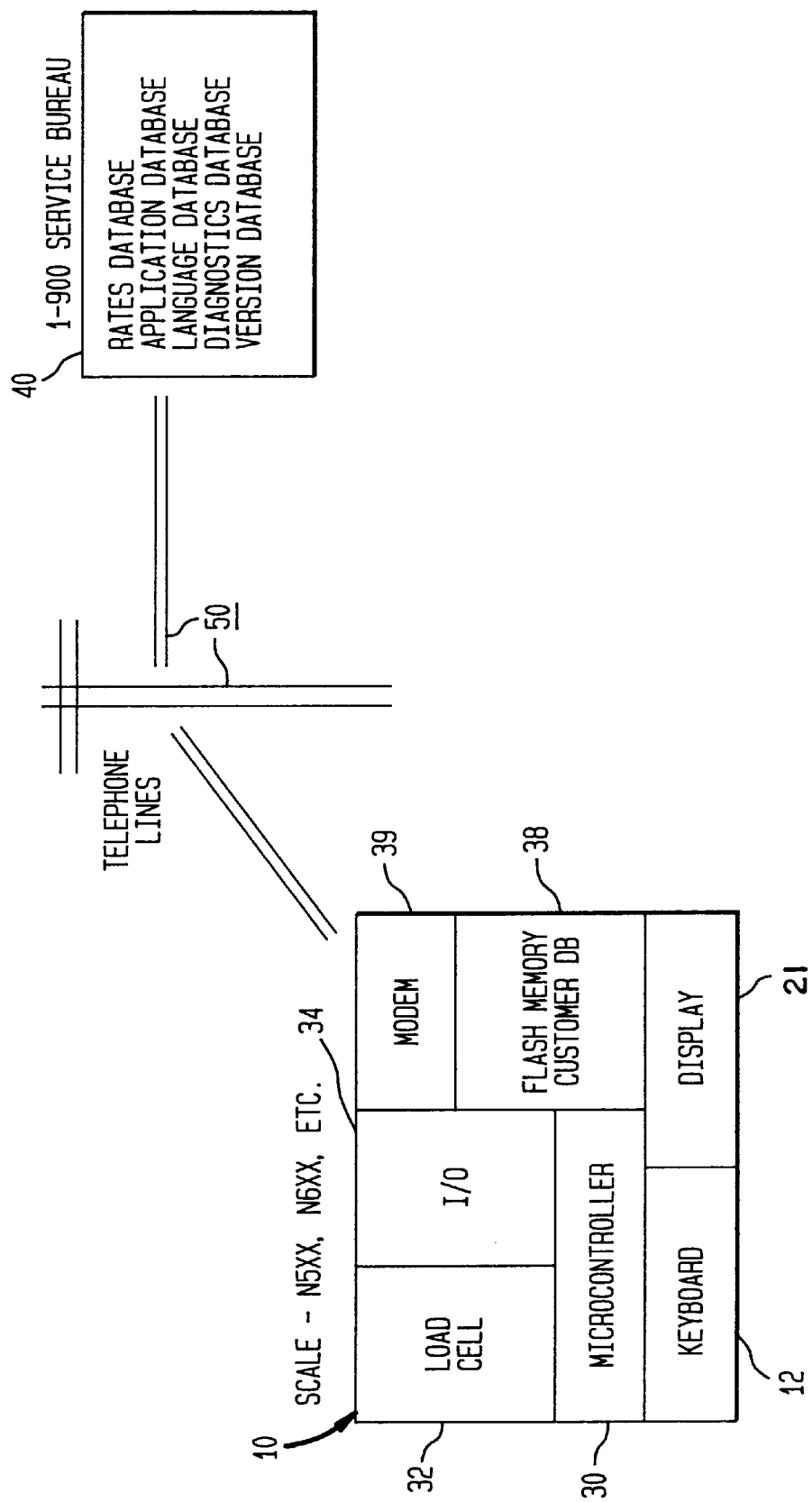
FIG. 2 shows a system incorporating the inventive concept.

Referring now to FIG. 2, shown therein is a functional representation of a postal scale of the type previously described at 10 in FIG. 1 and a service bureau therefor generally shown at 40. Postal scale 10 may be of a type commercially available from Pitney Bowes Inc. of Stamford, Conn. and designated by model numbers in series N500; N600; N900; B530 or B560, for example.

Only a single scale 10 is shown in FIG. 2. However, it should be recognized that the invention finds its greatest utility in a widely dispersed customer base, wherein a large number of postal scales are distributed to a large number of customers who may be in widely diverse geographical areas. In accordance with the invention, the service bureau 40 and the (plural) postal scales 10 are interconnected via telephone lines 50, as illustrated by the connection between the service bureau and the single scale shown for illustration in FIG. 1. While further discussion is in terms of a scale, in the singular, it should be appreciated that the description is, in fact, a description of operation of a large number of postal scales in communication with a single service bureau. The single service bureau may have a large number of service centers, at different locations which are more easily accessed from the various locations of the customer stations.

As functionally illustrated in FIG. 2, such scales generally include a load cell 32, an I/O section 34, alphanumeric keyboard 12, and a flash memory 38 storing the customer's database, which may be implemented as one of the chips 22 shown in FIG. 1. The scale is generally controlled by a microcontroller 30, which may be a type of microprocessor generally available from Intel Corporation as a single chip under designations 386, 486, PENTIUM® and the like. However, other types of microprocessors are available from other manufacturers and may be used instead, without departing from the scope of the invention. As also shown in FIG. 1, the postal scale 10 includes a modem 39 which communicates with the remote service bureau 40 over telephone lines 50. It should be appreciated that, although a modem and telephone lines are shown as the means of communication between scale 10 and service bureau 40, other means may be used without departing from the invention.

Service Bureau 40 is a resource provided to the large number of users and includes therein a number of databases. As known in the art, such databases are typically stored by computers managing the bureau on hard disc drives, though other storage media may be used.

As shown in FIG. 2, the service bureau includes databases storing information on postal rates (where the term "postal" is not restricted to governmentally supplied postal services, and may include private courier services such as UPS and Federal Express in the United States), language (software and/or human), and version of software, firmware or hardware being used in the various customer postal scales. Also available in an application database at the service bureau are a number of different software applications which may be used in the postal scales at the various customer sites. Yet another database maintained at the service bureau stores various diagnostics applicable to the postal scales provided to the customers, for diagnosing various hardware and/or software problems which may occur on occasions.

Although not shown in the Figure, it is clear that service bureau 40 includes a means for communicating with the various scales 10, such as a modem or other device for communicating over the telephone lines 50 or other communication medium.

Figure 3:
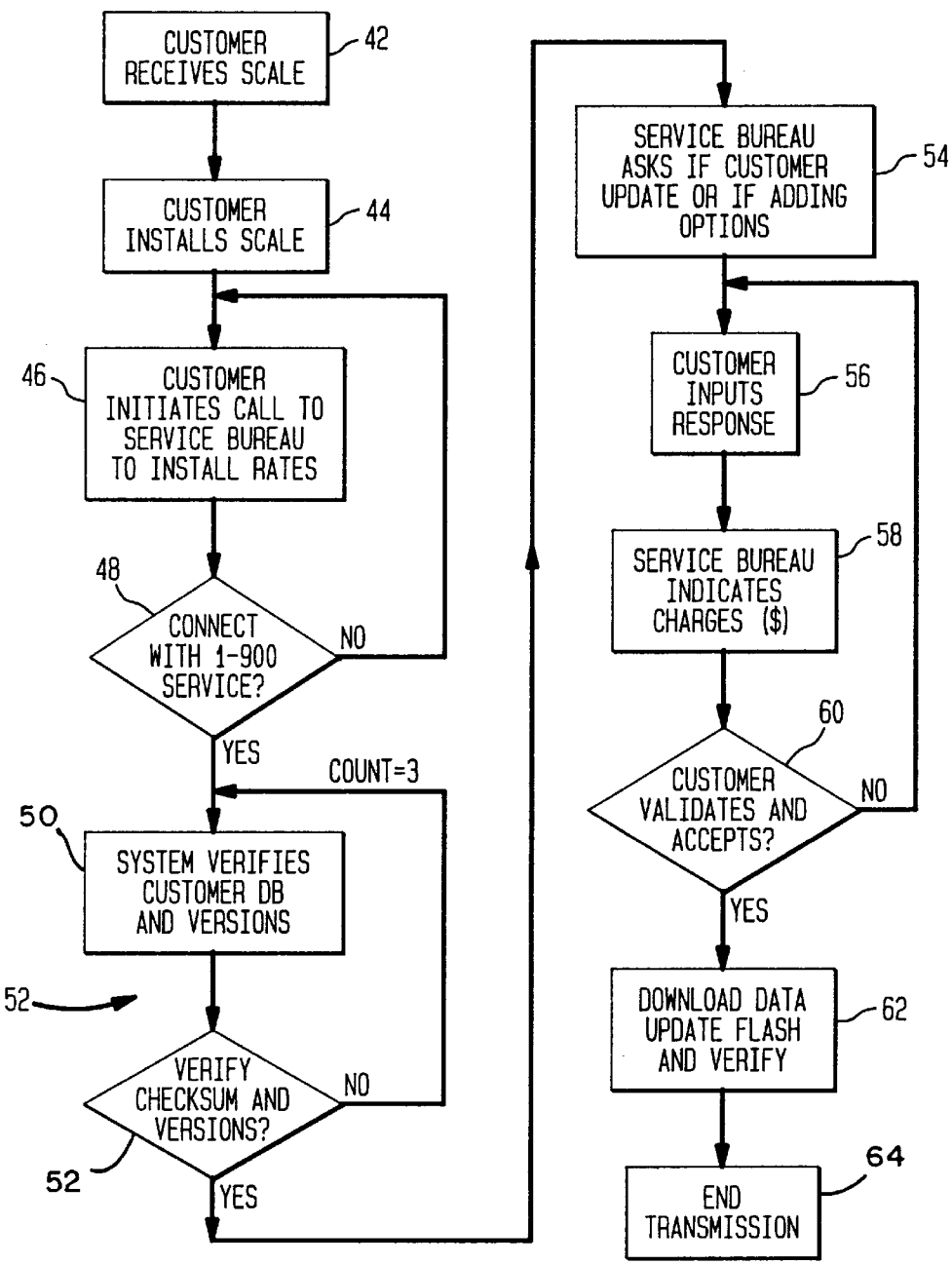
FIG. 3 is a flow chart describing operation of the invention.

Referring now to FIG. 3, disclosed therein is a sequence of operations which implement the present invention.

As will be appreciated, the illustrated sequence of operations includes a series of steps initiated by the customer, or user, upon first receiving and installing a postal scale. Both in the process of initial installation and during subsequent updates, the invention bypasses the prior art requirements for shipping of rate, zip/zone, directory or application PROM cards to the customer. Use of EEPROM cards or other re-writable, erasable, non-volatile memory in place of the PROM chips of FIG. 1 enables the invention to be implemented by retrofitting prior art scales of the type shown in FIG. 1 to a configuration as illustrated in FIG. 2.

Upon initial acquisition and delivery of a scale in accordance with the invention (shown at step 42 of FIG. 3), the customer installs the scale at step 44. Thus, steps 42 and 44 permit a customer to install a rate table (and other data) both during initial installation and for update purposes, by implementing the same step 46—i.e., by initiating a call to the Service Bureau. In accordance with the invention a "1-900" telephone number is associated with the Service Bureau. In a known manner, connection with the service bureau is implemented through the 1-900 service, as illustrated at step 48.

At this point, the Service Bureau reads the flash memory 38 of the customer device, and particularly accesses the information relevant to identifying model numbers and version numbers of hardware and software at the customer site, as well as information inputted during installation identifying a responsible managing party, present rate schedules and directories (if any), version numbers and checksums. In a known interaction, the service bureau verifies the information and checksums in the protocol illustrated at step 50 before querying at step 52 as to whether the checksum and versions should be verified. If the response to the query at step 52 is "NO," then the method returns to re-enter at step 50. If the response to the query is "YES," however, then the method moves to step 54. As will be appreciated, only a limited number of failures (e.g., 3) is permitted by this protocol.

Upon successful completion of the verifications at 52, the Service Bureau inquires at 54 whether the customer is updating an existing data base, or whether additional options are being added to an existing customer scale.

That is, the invention enables customers to acquire additional features for their systems by downloading additional application software. The Service Bureau question is displayed on display 21 of the postal scale and the user inputs an appropriate response via keyboard 12.

The type of display used at 21 is not a part of the present invention, but may include liquid crystal, LED, gas plasma devices, CRT screens or other displays. Indeed, the display may be in the form of a plurality of individual lights, whose illumination indicate individual questions to be answered or inputs to be provided, or may be in a form of a full video display of alpha-numeric characters. That is, the user may be prompted by fully formed, literal, questions or by individual lights. Moreover, other types of annunciators may be used, to provide audible or verbal prompts to the user.

The user's response may be on an alpha-numeric keyboard. However, for some implementations of the invention, inputs may be provided by using individual switches, or by using telephone keypads in which individual keys serve functions of both alphabetic and numeric inputs in a known fashion. Using such an input device, at step 56 the customer inputs a response to the prompt generated by Service Bureau question, thus identifying to the Service Bureau the particular service being requested. In an automated response thereto, at step 58 the Service Bureau determines the charges to be assessed for the requested service and displays the same to the user. At step 60 the customer may reconsider the initial request and may decide to add more or fewer features than earlier requested.

Upon validation and acceptance of the charges at step 60, and transmission of information indicative of such acceptance to the Service Bureau by keyboard 12 and modem 39 via phone lines 50, in response thereto the Service Bureau 40 downloads the requested data, software update, changed service or the like at step 62, thus updating the information stored in the flash memory 38 at the customer site; the transmission is then concluded at step 64. In a further interchange between the Service Bureau 40 and the postal meter 10, the transferred information is verified prior to ending transmission.

As will be appreciated from the description of the sequence of operations illustrated at FIG. 3, the present invention permits the remote service bureau to verify information relating to versions, model numbers and the like and to update its own database (e.g., protocol 52), thus avoiding the necessity for direct questioning of and response from the user. Moreover, without requirement of shipping of delicate chips for installation by the customer, relevant information is downloaded to the customer site, under control of the provider and subject to verification of proper receipt and installation of the same by the provider.

Still further, by using a 1-900 service available from third parties, the need for billing the customer for these services by the provider is reduced or completely eliminated, and the charges are assessed by the third party (such as by inclusion on a telephone bill). In fact, by adding a time and date stamp of a current communication to its database, the 1-900 system provides added verification of the charges.

In another feature, the invention permits the remote service bureau, upon reading the flash memory, to get, request and/or verify the Model Number of the postal scale (or other device) thus avoiding a possibility of mis-reporting of the same by a customer. Similarly, the serial number, the address of the installation, the version numbers of the currently installed software, rate data and other information and various checksums may also be obtained for verification. It will be appreciated that obtaining such information thus enables the service bureau to provide user-specific prompts, such as: "This system is presently operating under version 3.2. Under the currently available version 6.1 of the software, the following additional features are available . . . . Do you wish to update the system to version 6.1?" Such interaction may be provided following any of the steps in FIG. 3. Thus, the user-specific prompt may be provided instead of step 54. More particularly, such a user-specific prompt may be provided following downloading at step 62 of the information initially requested by the user, to permit and motivate updating in a single service call of features in addition to those which initially motivated the customer to call.

By providing such user-specific prompts, the likelihood of favorable update responses is increased, and the number of outdated systems being operated is reduced. Indeed, upon receipt of a favorable response the service bureau automatically updates the software or features of the installation, and again may generate a specific prompt as to further updates or service additions. Moreover, by updating the service bureau database, the present invention allows the provider to send out user specific mailings relating to future updates and enhancements related to the products at the user site. Still further, by providing virtually immediate response and update, customer satisfaction is increased, billing is simplified and collections for services are likely to improve.

Moreover, upon verification of the Model and Version Numbers, the provider is placed in a favorable position of being able to correct bugs or difficulties known to occur in the verified Models and Versions, prior to occurrence of a customer complaint. Further, when postal regulations or rates are changed, there may occur situations requiring changes in the sequences of keys being operated. However, the sequences may be associated with specific software driven annunciator sequences which identify the keying sequences. Such changes may be implemented by updating of the application software in the postal scales in addition to updating the rate tables. Thus, the invention permits modifications which are fully responsive to all types of changes occurring in the various postal and courier services.

The foregoing description of the preferred embodiment of the invention has been presented for purposes of illustration and description. It is not intended to be exhaustive or to limit the invention to the precise forms disclosed, since many modifications or variations thereof are possible in light of the above teaching.

For example, although specific types of software and data have been described as being updated at a user site, and specific information as being updated at the provider database, it should be understood that any type of data and software may be updated at either site without departing from the inventive concepts. Moreover, although communication has been indicated as being implemented over existing telephone lines, it should be understood that any type of communication may be used without departing from the inventive concepts. Still further, although the preferred embodiment has been described in terms of using an existing 1-900 service for billing users, other billing methods may be used without departing from the inventive concepts. All such modifications and variations are within the scope of the invention. The embodiments described herein were chosen and described in order best to explain the principles of the invention and its practical application, thereby to enable others skilled in the art to utilize the invention in various embodiments and with various modifications as are suited to the particular use contemplated therefor. It is intended that the scope of the invention be defined by the claims appended hereto, when interpreted in accordance with the full breadth to which they are legally and equitably entitled.

What is claimed is:

1. In a system including a postal apparatus at a customer site for providing an output representative of a postal value pursuant to postal regulations, and a service bureau at a remote location, the improvement comprising:

a method for providing updated postal information for storage in the postal apparatus upon change of the postal regulations, comprising the steps of:
 (a) establishing a bi-directional connection between the postal apparatus and the service bureau via a communication medium;
 (b) downloading the updated postal information to the postal apparatus via the bi-directional connection; and
 (c) billing the customer site by using the bi-directional connection to provide billing information for the updated postal information provided thereto.

2. A method for providing updated postal information in accordance with claim 1 wherein said step of establishing a bi-directional connection comprises using a modem to communicate between the customer site and the service bureau via a telephone medium, and further comprising the step of using the bi-directional connection over the telephone medium for access by the service provider of information stored in said postal apparatus at said customer site thereby to update a database at said service provider.

3. A method for providing updated postal information in accordance with claim 1, comprising the further step of downloading updated application software to the postal apparatus.

4. A method for providing updated postal information in accordance with claim 3 wherein said step of establishing a bi-directional connection comprises using a modem to communicate between the customer site and the service bureau via a telephone medium.

5. A method for providing updated postal information in accordance with claim 4 wherein said step of billing the customer site comprises using a third party billing service for generating billing charges provided to the customer site on telephone bills for use of telephone service provided thereto.

6. A method for providing updated postal information in accordance with claim 5 comprising the further step of using the bi-directional connection over the telephone medium for access by the service provider of information stored in said postal apparatus at said customer site thereby to update a database at said service provider.

7. In a system including a postal apparatus at a customer site for providing an output representative of a postal value pursuant to postal regulations, and a service bureau at a remote location, the improvement comprising:

a method for providing updated postal information for storage in the postal apparatus upon change of the postal regulations, comprising the steps of:
  (a) establishing a bi-directional connection between the postal apparatus and the service bureau via a communication medium;
  (b) downloading the updated postal information to the postal apparatus via the bi-directional connection; and
  (c) using the bi-directional connection for access by the service provider of information stored in said postal apparatus at said customer site thereby to update a database at said service provider.

8. A method for providing updated postal information in accordance with claim 7, wherein said step of establishing a bi-directional connection comprises using a modem to communicate between the customer site and the service bureau via a telephone medium.

9. A method for providing updated postal information in accordance with claim 8, further comprising the step of generating user specific prompts in accordance with said information stored in said postal apparatus at said customer site accessed by the service provider.

10. A method for providing updated postal information in accordance with claim 9, wherein said step of using the bi-directional connection for access by the service provider comprises accessing version number information and said step of generating user specific prompts comprises generating a prompt for updating software having an outdated version number with software having a current version number.

11. A method for providing updated postal information in accordance with claim 10 further comprising the step of billing the customer site by using the bi-directional connection to provide billing information for the updated postal information provided thereto.

12. A method for providing updated postal information in accordance with claim 11 wherein said step of billing the customer site comprises using a third party billing service for generating billing charges provided to the customer site on telephone bills for use of telephone service provided thereto.

* * * * *